United States Patent
Tung et al.

(10) Patent No.: US 8,983,125 B2
(45) Date of Patent: Mar. 17, 2015

(54) THREE-DIMENSIONAL IMAGE PROCESSING DEVICE AND THREE DIMENSIONAL IMAGE PROCESSING METHOD

(75) Inventors: Hsu-Jung Tung, Hsinchu County (TW); Chun-Hsing Hsieh, Hsin-Chu (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 280 days.

(21) Appl. No.: 13/532,726

(22) Filed: Jun. 25, 2012

(65) Prior Publication Data

US 2013/0011010 A1 Jan. 10, 2013

(30) Foreign Application Priority Data

Jul. 5, 2011 (TW) ............................ 100123633 A

(51) Int. Cl.
*G06K 9/00* (2006.01)
*H04N 13/00* (2006.01)

(52) U.S. Cl.
CPC ................................. *H04N 13/0022* (2013.01)
USPC ........................................................ 382/103

(58) Field of Classification Search
None
See application file for complete search history.

(56) References Cited

U.S. PATENT DOCUMENTS

| | | | |
|---|---|---|---|
| 5,929,859 A | 7/1999 | Meijers | |
| 7,573,475 B2 * | 8/2009 | Sullivan et al. | 345/427 |
| 8,206,218 B2 * | 6/2012 | Gutierrez Novelo | 463/30 |
| 8,385,684 B2 * | 2/2013 | Sandrew et al. | 382/284 |
| 8,611,694 B2 * | 12/2013 | Kogan et al. | 382/281 |
| 2006/0125921 A1 * | 6/2006 | Foote | 348/159 |
| 2007/0081716 A1 * | 4/2007 | Ha et al. | 382/154 |
| 2007/0279412 A1 * | 12/2007 | Davidson et al. | 345/419 |
| 2008/0208547 A1 | 8/2008 | Kim | |
| 2011/0158504 A1 * | 6/2011 | Turner et al. | 382/154 |

FOREIGN PATENT DOCUMENTS

| | | |
|---|---|---|
| CN | 1643939 A | 7/2005 |
| CN | 101246603 A | 8/2008 |
| TW | 243575 | 3/1995 |
| TW | 382093 | 2/2000 |
| WO | 2011001851 A1 | 1/2011 |

OTHER PUBLICATIONS

Feng Ding Cheng, "Depth Finding for Un-Calibrated Stereo Images by Area Based Matching Method", Master's thesis of Department of Engineering Science of National Cheng Kung University, pp. 12, 25, 39, Jul. 2007.

(Continued)

*Primary Examiner* — Nancy Bitar
(74) *Attorney, Agent, or Firm* — Winston Hsu; Scott Margo

(57) ABSTRACT

A 3D image processing device comprising: an object detecting unit, for detecting a first location for an object in a first image and a second location for the object in a second image; a disparity determining unit, coupled to the object detecting unit, for computing a disparity result for the object between the first image and the second image according to the first location and the second location; a displacement computing unit, coupled to the disparity determining unit, for computing a first displacement distance of the first image and a second displacement distance of the second image according to the disparity result; and a displacement unit, coupled to the displacement computing unit, for moving the first image and the second image to generate a first displaced image and a second displaced image, according to the first displacement distance and the second displacement distance.

14 Claims, 7 Drawing Sheets

(56) References Cited

OTHER PUBLICATIONS

Wang Cai De, Real-time Objects Detection and Tracking using Directional Edge Maps, Master's Thesis of Department of Computer Science of National Chengchi University, p. 5, Jul. 2008.

Wu Ming Fang, Li Zhen Xing, Wang Bing Gong, Zhan Hui Shan, Huang Jian Bang, "Multi-face visual recognition technology", Journal No. 8 of Kunshan University of Science and Technology, pp. 75, 78, Jun. 2011.

* cited by examiner

THREE-DIMENSIONAL IMAGE PROCESSING DEVICE AND THREE DIMENSIONAL IMAGE PROCESSING METHOD

BACKGROUND OF THE INVENTION

1. Field of the Invention

The present invention relates to a 3D (three-dimensional) image processing device and a 3D image processing method, and particularly relates to a 3D image processing device and a 3D image processing method, which horizontally moves planar images of left and right eyes to generate the 3D image.

2. Description of the Prior Art 3D display technique becomes more common in recent years, and is very popular for entertainment business. The reason why a human can see a 3D object is that the eyes of a human have independent visions. That is, the right eye can only catch the objects falling in the scope of the right eye, and the left eye can only catch the objects falling in the scope of the left eye. Since the eyes of a human are horizontally arranged and a distance exists between two eyes, thus some difference between the right eye image and the left eye image exist, which is called "disparity". A human brain can analyze the disparity and accordingly determine the distance of objects, to generate a 3D vision. Therefore, building a 3D image means rebuilding the disparity by an artificial manner. That is, display different images to the left eye and the right eye to simulate the 3D image.

If the image source is the image that a user takes by itself, for example, a left eye planar image taken from the left eye and a right eye planar image taken from the right eye, the displayed 3D effect will be affected by various reasons such as a focal length of the lens and a focus distance. Therefore, how to efficiently moves the left eye planar image and the right eye planar image becomes an important issue for this field.

SUMMARY OF THE INVENTION

Therefore, one objective of the present invention is to provide a 3D image processing device and a 3D image processing method, to move the left eye planar image and the second eye planar image to generate a 3D image, according to a image rule.

One embodiment of the present invention discloses a 3D image processing device, which comprises: an object detecting unit, for detecting a first location for an object in a first image and a second location for the object in a second image; a disparity determining unit, coupled to the object detecting unit, for computing a disparity result for the object between the first image and the second image according to the first location in the first image and the second location in the second image; a displacement computing unit, coupled to the disparity determining unit, for computing a first displacement distance of the first image and a second displacement distance of the second image according to the disparity result; and a displacement unit, coupled to the displacement computing unit, for moving the first image and the second image to generate a first displaced image and a second displaced image, according to the first displacement distance and the second displacement distance.

Another embodiment of the present invention discloses a 3D image processing method, which comprises: detecting a first location for an object in a first image and a second location for the object in a second image; computing a disparity result for the object between the first image and the second image according to the first location in the first image and the second location in the second image; computing a first displacement distance of the first image and a second displacement distance of the second image according to the disparity result; and respectively moving the first image and the second image to generate a first displaced image and a second displaced image, according to the first displacement distance and the second displacement distance.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
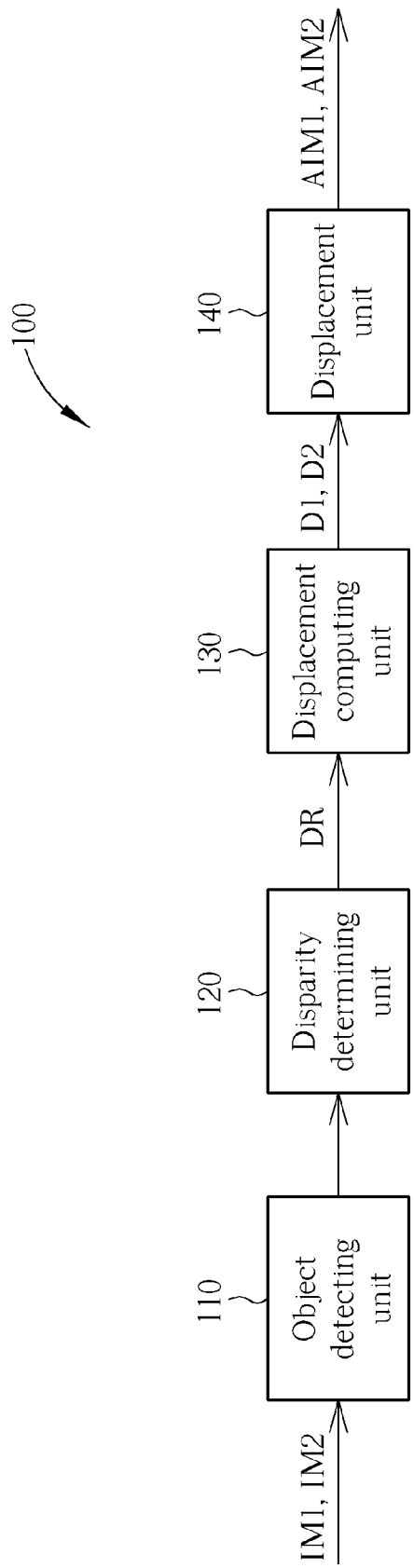
FIG. 1 is a schematic diagram illustrating a 3D image processing device according to one embodiment of the present invention.

Please refer to FIG. 1, FIG. 1 is a schematic diagram illustrating a 3D image processing device 100 according to one embodiment of the present invention. As shown in FIG. 1, the 3D image processing device 100 includes (but not limited to) an object detecting unit 110, a disparity determining unit 120, a displacement computing unit 130 and a displacement unit 140. The object detecting unit 110 detects a first location L for an object OB in a first image IM1 and a second location R for the object OB in a second image IM2. Please note that a left eye planar image and a right eye planar image are respectively utilized as examples for the first and second image, but it does not mean to limit the scope of the present invention. The disparity determining unit 120, which is coupled to the object detecting unit 110, computes a disparity result DR for the object OB between the first image IM1 and the second image IM2 according to the first location L in the first image IM1 and the second location R in the second image IM2. The displacement computing unit 130, which is coupled to the disparity determining unit 120, computes a first displacement distance D1 of the first image IM1 and a second displacement distance D2 of the second image IM2 according to the disparity result DR. The displacement unit 140, which is coupled to the displacement computing unit 130, moves the first image IM1 and the second image IM2 to generate a first displaced image AIM1 and a second displaced image AIM2, according to the first displacement distance D1 and the second displacement distance D2. It should be noted that the displacement unit 140 serves to perform horizontal displacement adjusting to the first image IM1 and the second image IM2 to generate a first displaced image AIM1 and a second displaced image AIM2, according to the first displacement distance D1 and the second displacement distance D2.

Additionally, the displacement computing unit 130 computes the first and the second displacement distance D1-D2 according to the disparity result and a specific rule. For example, the specific rule can indicate that a minimum angle for a visual angle of the object OB is 0 degree. Alternatively, the specific rule can indicate a rule that an image depth of the object OB is imaged on a display. For example, the displacement computing unit 130 can compute the first displacement distance D1 of the first image IM1 and the second displacement distance D2 of the second image IM2 via overlapping the first location L and the second location R.

Figure 2:
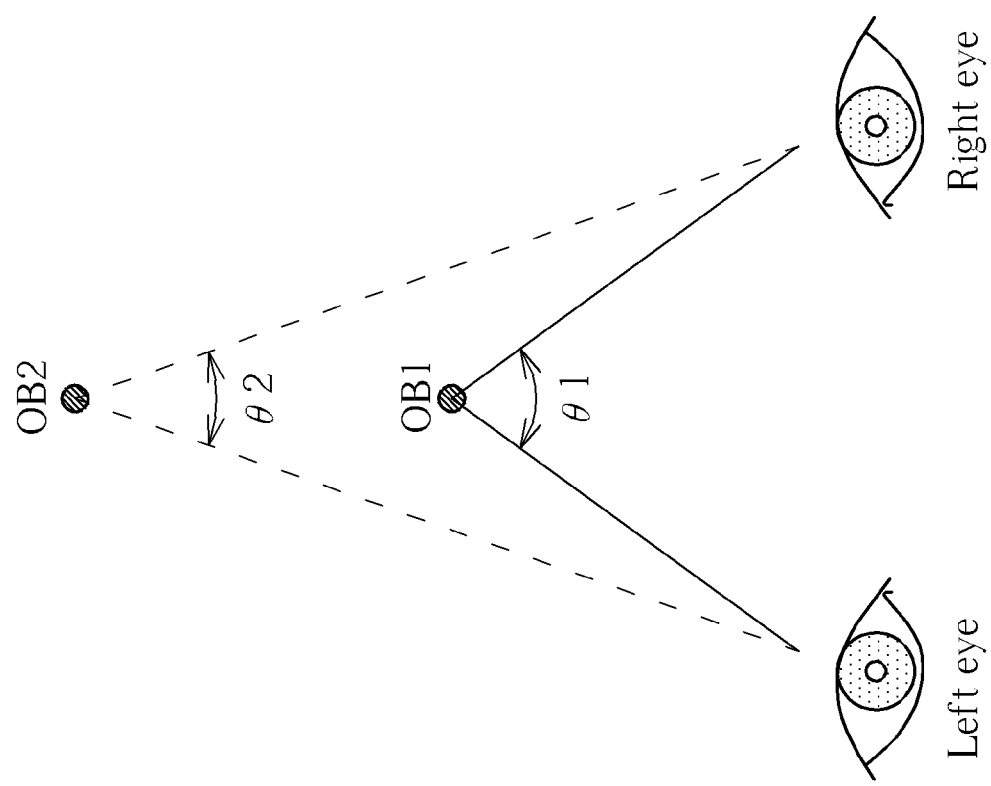
FIG. 2 is a schematic diagram illustrating a rule that a minimum angle for a visual angle of the object is 0 degree.

Please refer to FIG. 2, which is a schematic diagram illustrating a rule that a minimum angle for a visual angle of the object is 0 degree. As shown in FIG. 2, the visual angle θ indicates an intersection angle for two eyes vision line to the object OB. The visual angle θ changes corresponding to the distance that the observer is away from the object OB. For example, the object OB1 is closer to two eyes, thus the visual angle θ1 is larger. Oppositely, the object OB2 is farer from two eyes, thus the visual angle θ2 is smaller. That is, the visual angle θ becomes smaller proportional to the distance between the object OB and two eyes. Thus, if the distance between the object OB and two eyes is infinite, the visual angle θ is 0 degree. In other words, if the visual angle θ is smaller than 0 degree, the observer sees two images rather than a 3D image.

Figure 3:
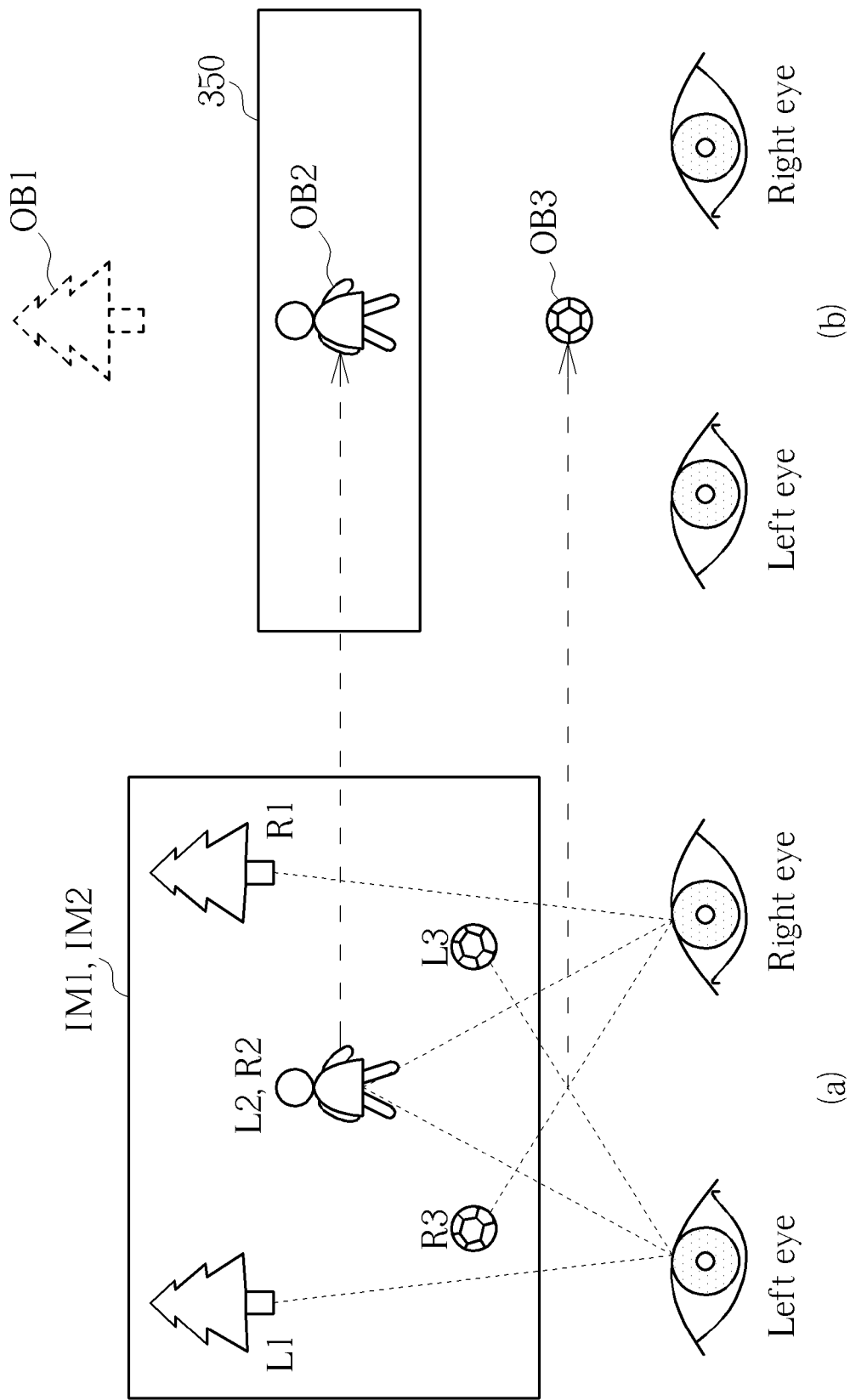
FIG. 3 is a schematic diagram illustrating a rule that an image depth of the object is imaged on a display.

Please refer to FIG. 3, which is a schematic diagram illustrating a rule that an image depth of the object is imaged on a display. Please note that FIG. 3 includes two sub FIGS. 3*a* and 3*b*. As shown in FIG. 3*a*, a first image IM1 and a second image IM2 are included. The first and second locations for the object OB1 in the first image IM1 and the second image IM2 are respectively L1 and R1; the first and second locations for the object OB2 in the first image IM1 and the second image IM2 are respectively L2 and R2; the first and second locations for the object OB3 in the first image IM1 and the second image IM2 are respectively L3 and R3. The first location L2 and the second location R2 also overlap if the first image IM1 and the second image IM1 overlap. Therefore, the intersection point for focusing vision lines for two eyes will locate at the overlap location of the first location L2 and the second location R2, while the observer is watching the object OB2. By this way, the image of the object OB2 will be displayed on the screen 350, as shown in FIG. 3*b*. However, when the observer is watching the object OB1, the focusing vision lines for two eyes have no intersection before the display, that is, two eyes are horizontally watching an object far away. Please note, in FIG. 3, the object OB1 is not imaged thus will not be displayed on the display. Besides, the intersection point for focusing vision lines for two eyes will locate in front of the display, while the observer is watching the object OB3. By this way, the image of the object OB2 will be displayed at the focusing point in front of the display 350.

Figure 4:
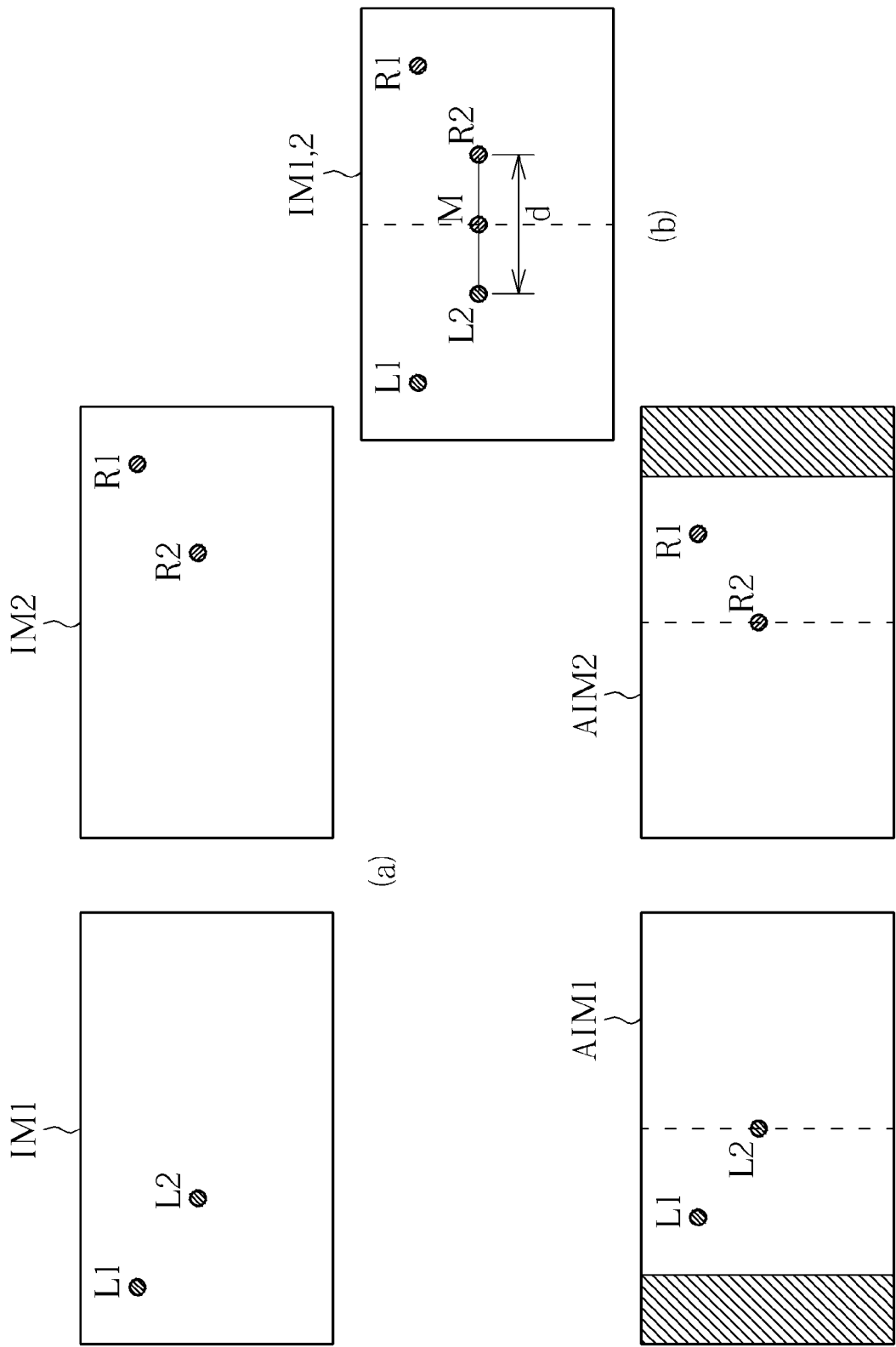
FIG. 4 is a schematic diagram illustrating the operation that the 3D image processing device performs horizontal displacement adjusting to the first and the second image to generate the first displaced image and the second displaced image, according to one embodiment of the present invention.

Next, an example is utilized to explain how the 3D image processing device 100 operates to generate displacement distance of the first and the second images IM1 and IM2. Please refer to FIG. 4, which is a schematic diagram illustrating the operation that the 3D image processing device 100 performs horizontal displacement adjusting to the first and the second image to generate the first displaced image and the second displaced image, according to one embodiment of the present invention. Please note that FIG. 4 includes three sub FIGS. 4*a*, 4*b* and 4*c*. FIG. 4*a* includes a first image IM1 and a second image IM2. First, as shown in FIG. 4*a*, the object detecting unit 110 detects that the first and second locations for the object OB1 in the first image IM1 and the second image IM2 are respectively L1 and R1; and the first and second locations for the object OB2 in the first image IM1 and the second image IM2 are respectively L2 and R2. Then, the disparity determining unit 120 computes a disparity result DR according to the first location L1 in the first image IM1 and the second location R1 in the second image IM2 for the object OB1, and the first location L2 in the first image IM1 and the second location R2 in the second image IM2 for the object OB2. In this embodiment, the disparity result DR determines that the distance between the object OB1 and two eyes is larger than which between the object OB2 and two eyes, and the visual angle is not smaller than 0 degree. Therefore, the objected OB2 is imaged near the display, and the object OB1 is imaged after the display. After that, the displacement computing unit 130 overlaps the first image IM1 and the second image IM2 (as shown in FIG. 4*b*), and utilizes a center coordinate of the first location L2 and the second location R2 as the image center M. Thereby the first displacement D1 and the second displacement distance D2 are computed to be right shift d/2 and left shift d/2. After that, the displacement unit 140 right-shifts the first image IM1 for d/2 and left-shifts the second image IM2 for d/2 to generate a first displaced image AIM1 and a second displaced image AIM2, as shown in FIG. 4*c*. Please note that the displacement unit 140 utilizes a black frame to mend the first displaced image AIM1 and the second displaced image AIM2 when the displacement unit 140 generates the first displaced image AIM1 and the second displaced image AIM2, as shown in FIG. 4*c*. Moreover, if the object OB has vertical displacement in the first image IM1 and the second image IM2, the displacement unit 140 can also adjust the vertical displacement when the displacement unit 140 generates the first displaced image AIM1 and the second displaced image AIM2. (By imaging the object near the display, the user's eye can easily build a 3D image due to the displaying depth.

Please note that the above-mentioned operation for imaging the object OB2 near the display is only an example to explain the present invention but does not mean to limit the scope of the present invention. In another embodiment of the present invention, the object OB1 can be imaged near the display, thereby the object OB2 is imaged between the display and two eyes. Additionally, the operation for utilizing a center coordinate of the first location L2 and the second location R2 as the image center M is also an example to explain the present invention but does not mean to limit the scope of the present invention. In another embodiment of the present invention, the coordinate of the first location L2 can be utilized as an image center M, or the coordinate of the second location R2 can be utilized as an image center M as well. By this way, only one image is needed to be horizontally moved.

If the above-mentioned disparity result DR determines that the object OB1 or the object OB2 has a visual angle θ smaller than 0 degree, the displacement 130 computes a first displacement D1 of the first image IM1 and a second displacement D2 of the second image IM2 to generate a 3D image according to the objects OB1 and OB2. That is, the above-mentioned two rules: a minimum angle for a visual angle of the object is 0 degree, and an image depth of the object is imaged on a display can be independently utilized as the determination rule for the displacement computing unit 130, but can also be simultaneously utilized as the determination rule for the displacement computing unit 130. By this way, different displacement amount may be determined. Therefore, the displacement computing unit 130 can finally utilize a weighting value set by the specific rule or utilizing other methods such as voting, to decide a final displacement of the first image IM1, IM2, but does not mean to limit the scope of the present invention.

Figure 5:
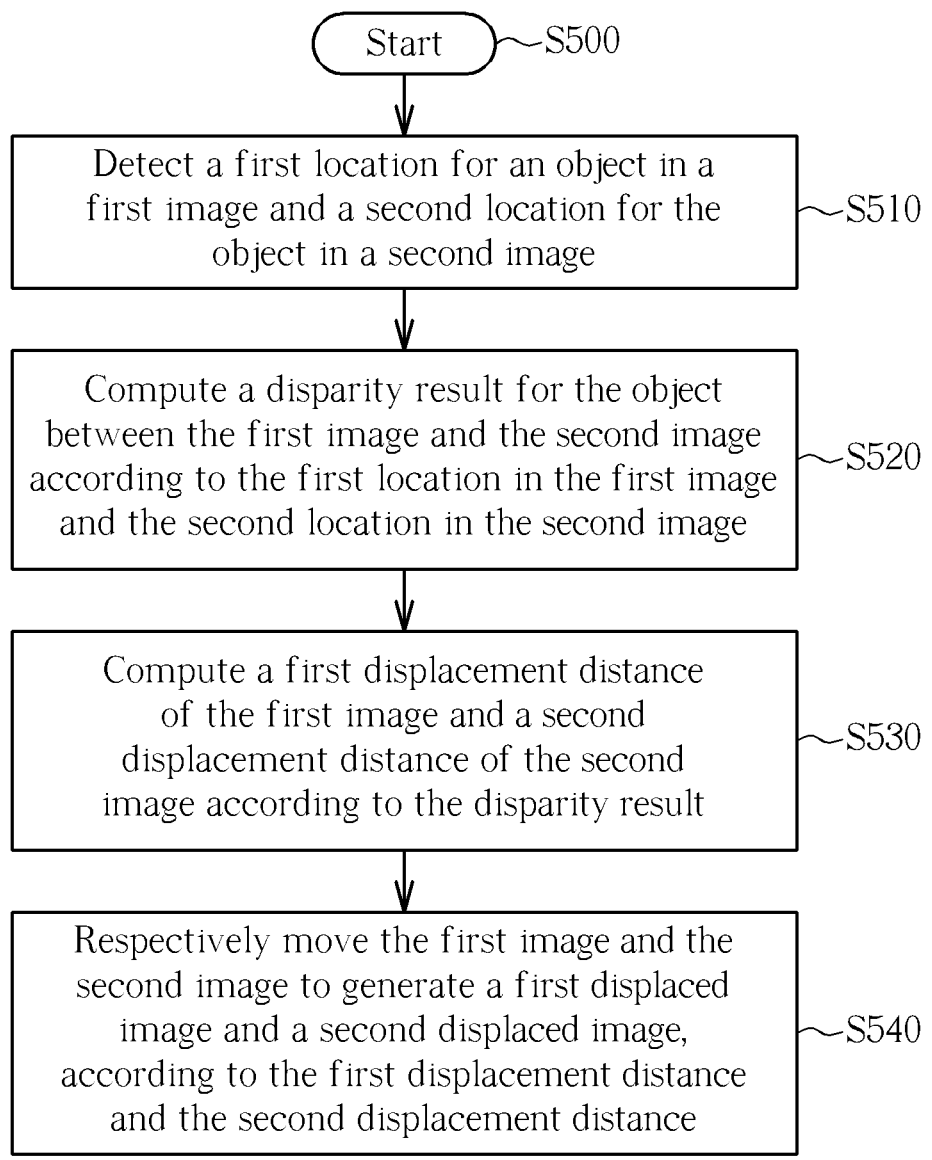
FIG. 5 is a flow chart illustrating a first exemplary operation for the 3D image processing device of the present invention.

Please refer to FIG. 5, which is a flow chart illustrating a first exemplary operation for the 3D image processing device of the present invention. FIG. 5 includes the following steps but is not limited. Also, if substantial the same result can be acquired, the steps are not limited to be performed following the order shown in FIG. 5.

Step S500: Start.

Step S510: Detect a first location for an object in a first image and a second location for the object in a second image.

Step S520: Compute a disparity result for the object between the first image and the second image according to the first location in the first image and the second location in the second image.

Step S530: Compute a first displacement distance of the first image and a second displacement distance of the second image according to the disparity result.

Step S540: Respectively move the first image and the second image to generate a first displaced image and a second displaced image, according to the first displacement distance and the second displacement distance.

Please jointly refer to the steps shown in FIG. 5 and the devices shown in FIG. 1 to understand how these devices operate. Other details are omitted for brevity here.

Figure 6:
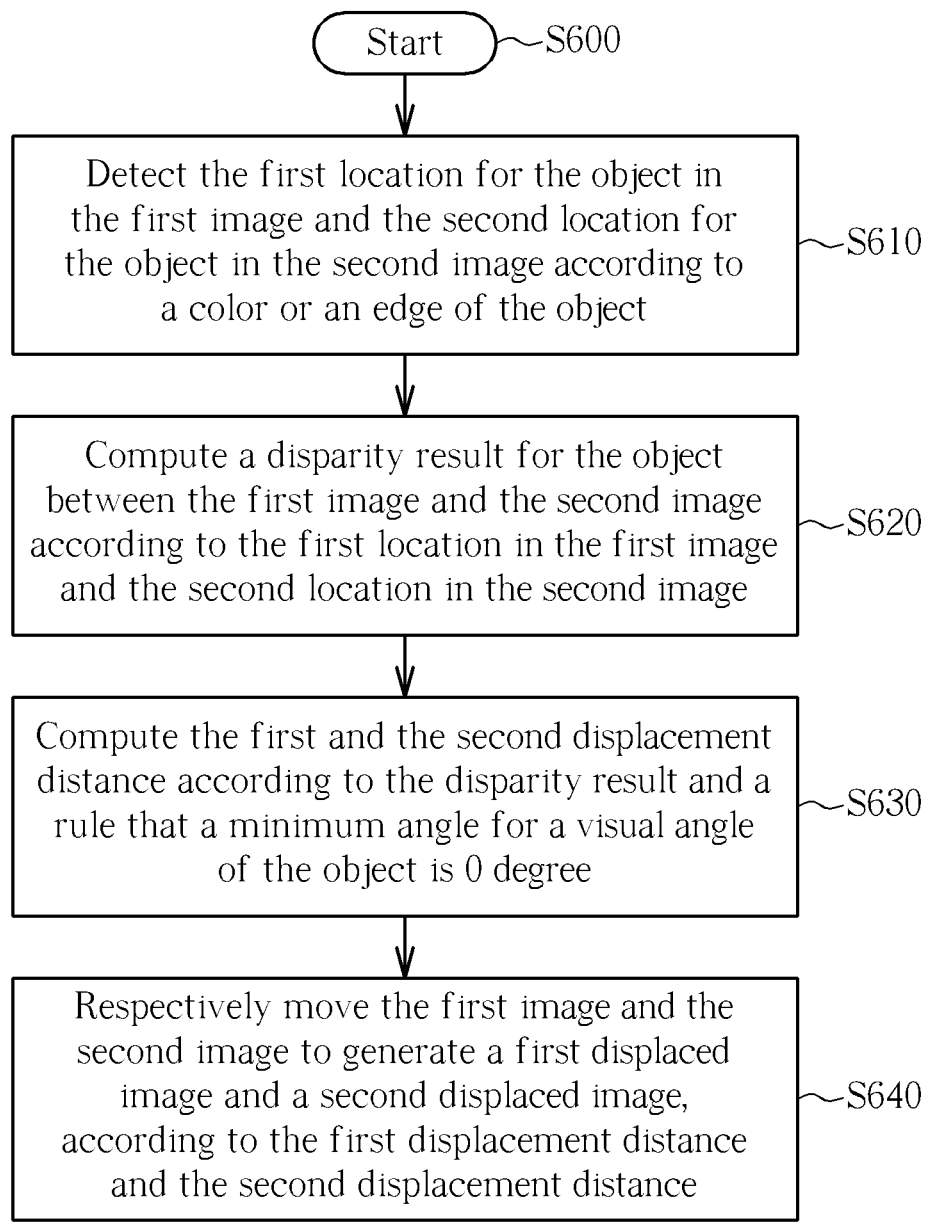
FIG. 6 is a flow chart illustrating a second exemplary operation for the 3D image processing device of the present invention.

Please refer to FIG. 6, which is a flow chart illustrating a second exemplary operation for the 3D image processing device of the present invention. FIG. 6 includes the following steps but is not limited. Also, if substantial the same result can be acquired, the steps are not limited to be performed following the order shown in FIG. 6.

Step S600: Start.

Step S610: Detect the first location for the object in the first image and the second location for the object in the second image according to a color or an edge of the object Step S620: Compute a disparity result for the object between the first image and the second image according to the first location in the first image and the second location in the second image.

Step S630: Computing the first and the second displacement distance according to the disparity result and a rule that a minimum angle for a visual angle of the object is 0 degree.

Step S640: Respectively move the first image and the second image to generate a first displaced image and a second displaced image, according to the first displacement distance and the second displacement distance.

Please jointly refer to the steps shown in FIG. 6, the devices shown in FIG. 1 and the specific rule shown in FIG. 2 to understand how these devices operate. Other details are omitted for brevity here.

Figure 7:
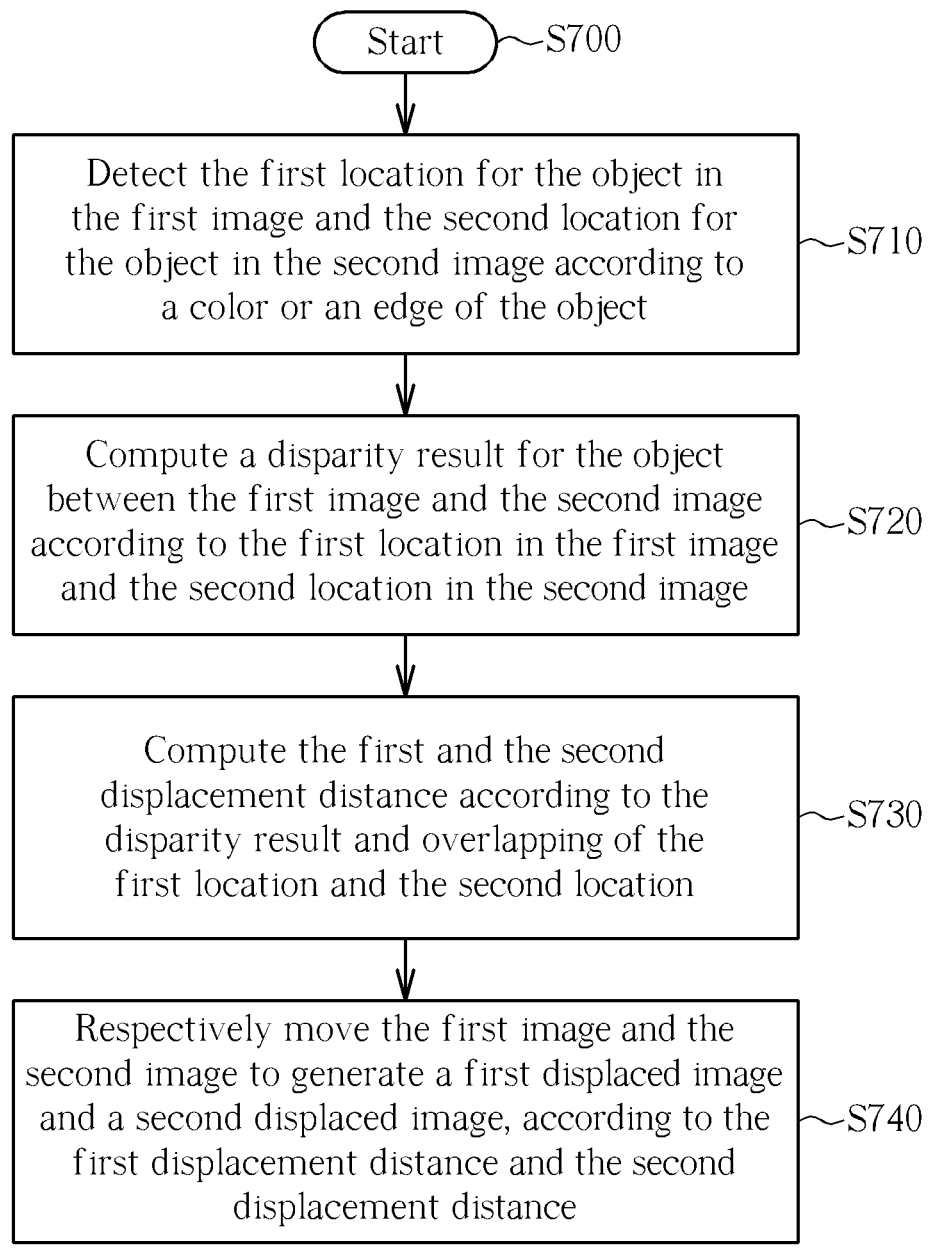
FIG. 7 is a flow chart illustrating a third exemplary operation for the 3D image processing device of the present invention.

Please refer to FIG. 7, which is a flow chart illustrating a third exemplary operation for the 3D image processing device of the present invention. FIG. 7 includes the following steps but is not limited. Also, if substantial the same result can be acquired, the steps are not limited to be performed following the order shown in FIG. 7.

Step S700: Start.

Step S710: Detect the first location for the object in the first image and the second location for the object in the second image according to a color or an edge of the object Step S720: Compute a disparity result for the object between the first image and the second image according to the first location in the first image and the second location in the second image.

Step S730: Compute the first and the second displacement distance according to the disparity result and overlapping of the first location and the second location Step S740: Respectively move the first image and the second image to generate a first displaced image and a second displaced image, according to the first displacement distance and the second displacement distance.

Please jointly refer to the steps shown in FIG. 7, the devices shown in FIG. 1 and the specific rule in FIG. 3, to understand how these devices operate. Other details are omitted for brevity here.

The above-mentioned steps are only examples to explain possible embodiments of the present invention, but do not mean to limit the scope of the present application. Some variation can be performed to the embodiment without obeying the basic concept of the present invention. For example, some steps can be removed or merged, to reach the same function.

In view of above-mentioned embodiments, the present invention provides a 3D image processing device and a 3D image processing method, to compute the first and the second displacement distance according to the disparity result and a specific rule to move the left eye planar image and the right eye planar image to generate a 3D image. Therefore, a common camera can be utilized to generate a 3D image via taking a photo respectively for the right eye and the left eye, based on the concept disclosed in the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A 3D image processing device, comprising:
    an object detecting unit, for detecting a first location for an object in a first image and a second location for the object in a second image;
    a disparity determining unit, coupled to the object detecting unit, for computing a disparity result for the object between the first image and the second image according to the first location in the first image and the second location in the second image;
    a displacement computing unit, coupled to the disparity determining unit, for computing a first displacement distance of the first image and a second displacement distance of the second image according to the disparity result, wherein the displacement computing unit computes the first and the second displacement distance according to the disparity result and a specific rule, wherein the specific rule includes a rule that a minimum angle for a visual angle of the object is 0 degree; and a displacement unit, coupled to the displacement computing unit, for moving the first image and the second image to generate a first displaced image and a second displaced image, according to the first displacement distance and the second displacement distance.

2. The 3D image processing device of claim 1, wherein the object detecting unit detects the first location for the object in the first image and the second location for the object in the second image according to a color or an edge of the object.

3. The 3D image processing device of claim 1, wherein the specific rule further comprises a rule that an image depth of the object is imaged on a display.

4. The 3D image processing device of claim 3, wherein the displacement computing unit computes the first displacement distance of the first image and the second displacement distance of the second image via overlapping the first location and the second location.

5. The 3D image processing device of claim 1, wherein the displacement unit respectively performs horizontal displacement adjusting to the first image and the second image according to the first displacement distance and the second displacement distance, to generate the first displaced image and the second displaced image.

6. The 3D image processing device of claim 1, wherein the displacement unit utilizes a black frame to mend the first displaced image and the second displaced image when the displacement unit generates the first displaced image and the second displaced image.

7. The 3D image processing device of claim 1, wherein the displacement unit further adjusts vertical displacement when the displacement unit generates the first displaced image and the second displaced image.

8. A 3D image processing method, comprising:
   detecting a first location for an object in a first image and a second location for the object in a second image;
   computing a disparity result for the object between the first image and the second image according to the first location in the first image and the second location in the second image;
   computing a first displacement distance of the first image and a second displacement distance of the second image according to the disparity result, comprising:
      computing the first and the second displacement distance according to the disparity result and a specific rule, wherein the specific rule includes a rule that a minimum angle for a visual angle of the object is 0 degree; and
   respectively moving the first image and the second image to generate a first displaced image and a second displaced image, according to the first displacement distance and the second displacement distance.

9. The 3D image processing method of claim 8, wherein the step of detecting a first location for an object in a first image and a second location for the object in a second image comprises:
   detecting the first location for the object in the first image and the second location for the object in the second image according to a color or an edge of the object.

10. The 3D image processing method of claim 8, wherein the specific rule further comprises a rule that an image depth of the object is imaged on a display.

11. The 3D image processing method of claim 10, wherein the step of moving the first image and the second image to generate a first displaced image and a second displaced image, according to the first displacement distance and the second displacement distance comprises:
   computing the first displacement distance of the first image and the second displacement distance of the second image via overlapping the first location and the second location.

12. The 3D image processing method of claim 8, wherein the step of moving the first image and the second image to generate a first displaced image and a second displaced image, according to the first displacement distance and the second displacement distance comprises:
   respectively performing horizontal displacement adjusting to the first image and the second image according to the first displacement distance and the second displacement distance, to generate the first displaced image and the second displaced image.

13. The 3D image processing method of claim 8, wherein the step of moving the first image and the second image to generate a first displaced image and a second displaced image, according to the first displacement distance and the second displacement distance comprises:
   utilizing a black frame to mend the first displaced image and the second displaced image while generating the first displaced image and the second displaced image.

14. The 3D image processing method of claim 8, wherein the step of moving the first image and the second image to generate a first displaced image and a second displaced image, according to the first displacement distance and the second displacement distance comprises:
   adjusting horizontal displacement while generating the first displaced image and the second displaced image.

* * * * *